US009676485B2

(12) United States Patent
Stothers et al.

(10) Patent No.: US 9,676,485 B2
(45) Date of Patent: *Jun. 13, 2017

(54) ICE DETECTION SYSTEM AND METHOD

(71) Applicants: Ultra Electronics Limited, Greenford, Middlesex (GB); The Boeing Company, Seattle, WA (US)

(72) Inventors: Ian McGregor Stothers, Saham Toney (GB); Hosam E. El-Gabalawy, Bothell, WA (US)

(73) Assignees: Ultra Electronics Limited, Greenford (GB); The Boeing Company, Seattle, WA (US)

( * ) Notice: Subject to any disclaimer, the term of this patent is extended or adjusted under 35 U.S.C. 154(b) by 608 days.

This patent is subject to a terminal disclaimer.

(21) Appl. No.: 13/953,276

(22) Filed: Jul. 29, 2013

(65) Prior Publication Data

US 2013/0341464 A1    Dec. 26, 2013

Related U.S. Application Data

(62) Division of application No. 12/879,179, filed on Sep. 10, 2010, now Pat. No. 8,517,601.

(51) Int. Cl.
*G01N 25/02* (2006.01)
*B64D 15/20* (2006.01)
*H05B 1/02* (2006.01)

(52) U.S. Cl.
CPC ........... *B64D 15/20* (2013.01); *H05B 1/0236* (2013.01)

(58) Field of Classification Search
USPC .................... 374/16, 166, 110, 45
See application file for complete search history.

(56) References Cited

U.S. PATENT DOCUMENTS

| 4,222,044 | A |   | 9/1980  | Boschung |   |
|-----------|---|---|---------|----------|---|
| 4,882,574 | A |   | 11/1989 | Khurgin  |   |
| 5,709,470 | A | * | 1/1998  | Finley   | G01N 25/04 340/580 |
| 6,194,685 | B1 |  | 2/2001  | Rutherford |        |

(Continued)

FOREIGN PATENT DOCUMENTS

| GB | 2 023 291 A | 12/1979 |
| GB | 2 165 649 A | 4/1986  |

(Continued)

*Primary Examiner* — Mirellys Jagan
(74) *Attorney, Agent, or Firm* — Blank Rome LLP

(57) ABSTRACT

An ice detection system, in particular a method, apparatus and controller for detecting icing conditions and the presence of ice formed on a structure. Also, a method, apparatus and controller to detect the prevailing environmental conditions to determine whether or not ice may form on a structure. Two heaters of an ice protection system (experiencing substantially the same environmental conditions) are driven to different temperatures (the first greater than or equal to 0° C., and the second less than 0° C.). A difference in the powers required to drive the two heaters indicates the prevailing environmental conditions. In another embodiment, a heater of an ice protection system is driven and the rate of change of surface temperature is measured over several periods. A substantial deviation from a rate of change of surface temperature, which indicates the presence of ice on the surface of the structure, is detected.

35 Claims, 4 Drawing Sheets

(56) References Cited

U.S. PATENT DOCUMENTS

| | | |
|---|---|---|
| 6,328,467 B1 | 12/2001 | Keyhani |
| 7,580,777 B2 | 8/2009 | Smith et al. |
| 8,037,750 B2 | 10/2011 | Heuer et al. |
| 2005/0268710 A1* | 12/2005 | Rasmussen ............ B64D 15/20 73/170.26 |
| 2009/0149997 A1 | 6/2009 | Stothers |
| 2009/0230239 A1 | 9/2009 | Stothers |
| 2012/0099616 A1* | 4/2012 | Penny .................... G01N 25/68 374/16 |
| 2012/0269227 A1 | 10/2012 | Stothers |
| 2014/0191084 A1* | 7/2014 | Gambino ................ B64D 15/12 244/134 D |
| 2015/0110149 A1* | 4/2015 | Begin-Drolet ......... G01N 25/56 374/16 |
| 2015/0346122 A1* | 12/2015 | Stothers ................. B64D 15/14 702/130 |

FOREIGN PATENT DOCUMENTS

| | | |
|---|---|---|
| GB | 2 450 653 A | 12/2008 |
| GB | 2450503 A | 12/2008 |
| GB | 2 475 553 A | 5/2011 |
| RU | 2243923 C1 | 1/2005 |
| RU | 2307050 C1 | 9/2007 |
| RU | 2393976 C1 | 7/2010 |
| WO | WO 91/04646 A1 | 4/1991 |
| WO | WO 2007/107732 A1 | 9/2007 |
| WO | WO 2008/145985 A2 | 12/2008 |
| WO | WO 2010/055215 A1 | 5/2010 |
| WO | WO 2010/070273 A1 | 6/2010 |

\* cited by examiner

HEATER ZONE

ICE DETECTION SYSTEM AND METHOD

This is a divisional of application Ser. No. 12/879,179, filed Sep. 10, 2010, the disclosure of which is incorporated by reference in its entirely herein.

FIELD OF THE INVENTION

The present invention relates to an ice detection system, in particular to a system for detecting icing conditions and a system for detecting the presence of ice formed on a structure, and the methods for doing the same.

BACKGROUND OF THE INVENTION

Devices for detecting the presence of ice on structures, for example aircraft structures, are known. Example devices include those that detect ice formation using optical means (i.e. detecting a change in opacity or refractive index around a sensor). Others include those that monitor changes in a resonant frequency of a structure (i.e. the accumulation of ice on a structure alters its resonant frequency).

We have appreciated the disadvantages of known devices for detecting the presence of ice, and the need for an improved device.

SUMMARY OF THE INVENTION

The present invention provides a method of detecting an icing condition in which ice may form on a structure, the method comprising: supplying a first heater with a first power, the first heater being in thermal contact with a first region of a structure, and the first power being sufficient to heat the first region of the structure to a first temperature; supplying a second heater with a second power, the second heater being in thermal contact with a second region of a structure, and the second power being sufficient to heat the second region of the structure to a second temperature; and comparing the first and second powers to detect a difference between the first and second powers, the difference indicating an icing condition, wherein the first and second regions are subjected to substantially the same environmental conditions, and wherein the first temperature is higher than the second temperature.

By using this method, the prevailing conditions may be detected using an ice protection system already installed in the structure.

Preferably, the first temperature is greater than or equal to 0° C., and the second temperature is less than 0° C. More preferably, the first temperature is between 3° C. to 5° C., and the second temperature is between minus 3° C. to minus 5° C.

In embodiments, the difference between the first and second powers indicative of an icing condition is two or more times greater than the second power.

In some embodiments, the method is repeated periodically. Preferably, when repeated, the first heater is supplied with the second power to heat the first region to the second temperature, and the second heater is supplied with the first power to heat the second region to the first temperature. Preferably, the repeating interval is substantially 30 seconds.

The present invention also provides apparatus for detecting an icing condition in which ice may form on a structure, the apparatus comprising: a first and second heater mat thermally coupleable to a structure for heating a respective first and second region of a structure adjacent to the respective first and second heater mats; a first and second temperature sensor for outputting respective first and second temperature sensor signals indicative of a respective first and second temperatures of the respective first and second regions; a controller for controllably applying power to the first and second heater mats, the controller being adapted to: supply a first and second power to the respective first and second heater mats, the first power being sufficient to heat the first region of a structure to a first temperature and the second power being sufficient to heat the second region of a structure to a second temperature; receive first and second temperature sensor signals from the respective first and second temperature sensors; and compare the first and second powers to detect a difference between the first and second powers indicative of an icing condition, wherein the first and second regions are located so as to experience substantially the same environmental conditions, and wherein the first temperature is higher than the second temperature.

Using this apparatus allows a user to detect whether the prevailing environmental conditions are conducive to icing on a structure.

Preferably, the first temperature is greater than or equal to 0° C., and the second temperature is less than 0° C. More preferably, the first temperature is between 3° C. to 5° C., and the second temperature is between minus 3° C. to minus 5° C.

In embodiments of the apparatus, the difference between the first and second powers indicative of an icing condition is two or more times greater than the second power.

The present invention also provides a controller for detecting an icing condition in which ice may form on a structure, the controller for controlling an ice protection system, the controller comprising: an output adapted to supply a first and second power to a respective first and second heater mat of an ice protection system, the first and second heater mat being thermally coupleable to a structure for heating a respective first and second regions of a structure adjacent to a respective first and second heater mat; and an input adapted to receive a first and second temperature sensor signal from a respective first and second temperature sensor, the first and second temperature sensor signals indicating a temperature at a first and second region of a surface adjacent to a respective first and second heater mat, the controller being adapted to: supply the first and second power to a respective first and second heater mats, the first power being sufficient to heat the first region of a structure to a first temperature and the second power being sufficient to heat the second region of a structure to a second temperature; receive first and second temperature sensor signals from a respective first and second temperature sensor; and compare the first and second powers to detect a difference between the first and second powers indicative of an icing condition, wherein the first and second regions are located so as to experience substantially the same environmental conditions, and wherein the first temperature is higher than the second temperature.

By using such a controller, an ice protection system installed in a structure may be adapted to detect icing conditions.

Preferably, the first temperature is greater than or equal to 0° C., and the second temperature is less than 0° C. Preferably, the first temperature is between 3° C. to 5° C., and the second temperature is between minus 3° C. to minus 5° C.

In embodiments of the controller, the difference between the first and second powers indicative of an icing condition is two or more times greater than the second power.

The present invention also provides a method of detecting ice formed on a structure, the method comprising: supplying power to a heater mat, the heater mat being in thermal contact with a structure on which ice is to be detected, and the power being sufficient to heat a surface of a structure adjacent the heater mat to greater than 0° C.; measuring a surface temperature of the structure adjacent the heater mat over a first and second period; determining a first and second rate of change of surface temperature over the respective first and second periods; comparing the determined first and second rate of change of surface temperature to determine a difference between the first and second rate of change of surface temperature; and detecting ice formed on a structure based on a difference between the first and second rate of change of surface temperature being greater than a threshold value.

By using such a method, the formation of ice on a structure may be detected by using an ice protection systems already installed in the structure.

In embodiments of this method, the threshold value is determined from a model of the rate of change of surface temperature for the structure having no ice on the surface.

In embodiments, measuring the surface temperature of the structure comprises determining the surface temperature from a sensor mounted adjacent to, and in thermal contact with, the heater mat.

In some embodiments, determining a difference between the first and second rate of change of surface temperature comprises determining the magnitude of the difference between the first and second rate of change.

The present invention also provides a method of detecting ice formed on a structure, the method comprising: supplying power to a heater mat, the heater mat being in thermal contact with a structure on which ice is to be detected, and the power being sufficient to heat a surface of a structure adjacent the heater mat to greater than 0° C.; measuring a surface temperature of the structure adjacent the heater mat over a first period; comparing the measured surface temperature over the first period with a model defining surface temperature characteristics of the structure and heater mat; and detecting ice formed on a structure based on a difference between the measured surface temperature and the model.

The present invention also provides apparatus for detecting ice formed on a structure, the apparatus comprising: a heater mat thermally coupleable to a structure for heating a first region of a structure adjacent to the heater mat; a temperature sensor for outputting a temperature sensor signal indicative of a temperature of the first region; a controller for controllably applying power to heater mat, the controller being adapted to: supply a first power to the heater mat, the first power being sufficient to heat the first region of a structure to greater than 0° C.; receive a temperature sensor signal indicative of a temperature of the first region; determine a first and second rate of change of surface temperature over a respective first and second period; compare the determined first and second rate of change of surface temperature to determine a difference between the first and second rate of change of surface temperature; and detect ice formed on a structure based on a difference between the first and second rate of change of surface temperature being greater than a threshold value.

By using this apparatus, ice may be detected on the surface of a structure.

In embodiments of this apparatus, the threshold value is determined from a model of the rate of change of surface temperature for the structure having no ice on the surface.

In embodiments, the temperature sensor is mounted adjacent to, and in thermal contact with, the heater mat.

In embodiments, the controller is adapted to determine the magnitude of the difference between the first and second rate of change.

The present invention also provides a controller for detecting ice formed on a structure, the controller for controlling an ice protection system, the controller comprising: an output adapted to supply a first power to a heater mat of an ice protection system, the heater mat being thermally coupleable to a structure for heating a first region of a structure adjacent to the heater mat; and an input adapted to receive a temperature sensor signal from a temperature sensor, the temperature sensor signal indicating a temperature at a first region of a surface adjacent to a heater mat, the controller being adapted to: supply a first power to the heater mat, the first power being sufficient to heat the first region of a structure to greater than 0° C.; receive a temperature sensor signal indicative of a temperature of the first region; determine a first and second rate of change of surface temperature over a respective first and second period; compare the determined first and second rate of change of surface temperature to determine a difference between the first and second rate of change of surface temperature; and detect ice formed on a structure based on a difference between the first and second rate of change of surface temperature being greater than a threshold value.

By using such a controller, an ice protection system already present in a structure may be driven to detect whether or not ice has formed on the structure.

In embodiments, the threshold value is determined from a model of the rate of change of surface temperature for the structure having no ice on the surface.

In some embodiments, the controller is adapted to determine the magnitude of the difference between the first and second rate of change.

The present invention also provides an aircraft comprising the apparatus as described above, wherein the heater mats are thermally coupled to the aircraft structure.

The present invention also provides an aircraft comprising: a de-icing system comprising one or more heater mats thermally coupled to a structure of the aircraft; and a controller as described above.

Although each aspect and various features of the present invention have been defined hereinabove independently, it will be appreciated that, where appropriate, each aspect can be used in any combination with any other aspect(s) or features of the invention. In particular, features disclosed in relation to apparatus aspects may be provided in appropriate form in relation to method aspects, and vice versa.

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
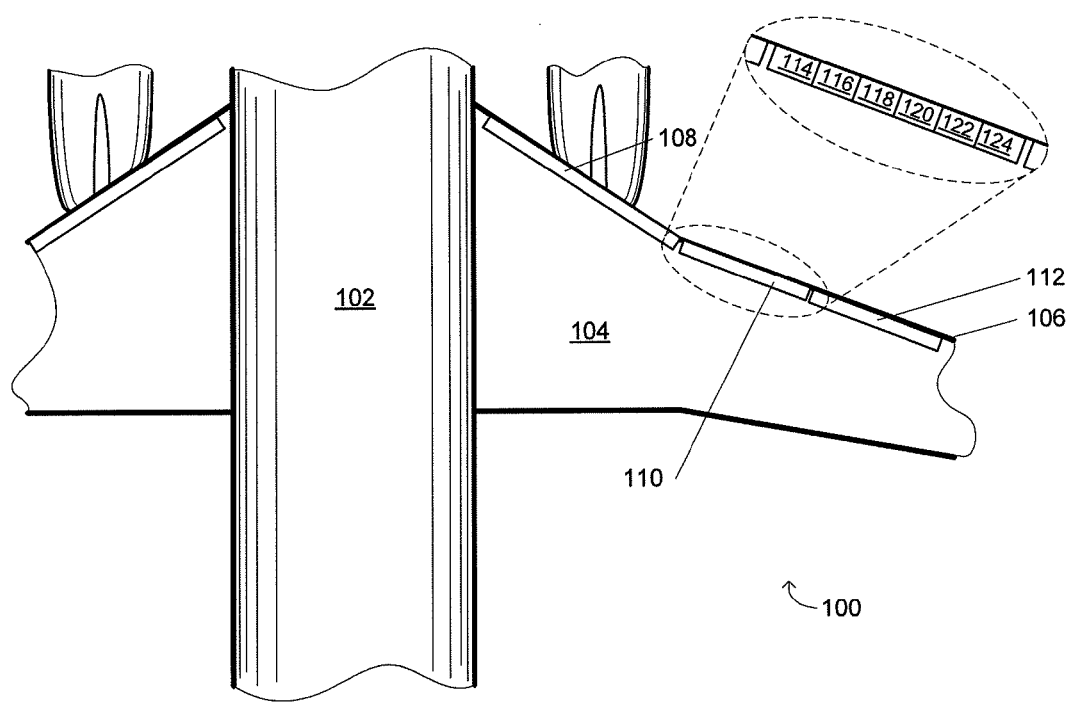
FIG. 1 is an illustration of the placement of heater mats and heater zones of an ice protection system of an aircraft.

In brief, the present invention utilises an ice protection system already installed in a structure (for example an aircraft structure) to detect the presence of ice formed on the surface of the structure. The present invention may also be used to detect the presence of ice in the prevailing environmental conditions surrounding the structure, which indicates to a user that ice may be likely to form on the structure. The present invention may also be used to give an indication of the concentration of ice in the surrounding environment, or formed on the structure.

Ice protection systems protect against the build-up of ice on structures. One common application of ice protection systems is on aircraft. During flight, the surfaces of an aircraft can be exposed to water at low temperatures and, if no preventative action is taken, ice can quickly form on the wings, on control surfaces, and on other parts of the aircraft in such a way as to alter the aerodynamic performance of the aircraft (for example by altering the airflow around the aircraft and by adding additional weight to it) with potentially catastrophic consequences. Example ice protection systems are discussed in the following patents and applications in the name of Ultra Electronics Limited (the content of which are hereby incorporated in their entirety by reference): U.S. Pat. No. 7,580,777, WO2008/145985, US20090149997, US20090230239 and U.S. Ser. No. 12/666,776.

Electrothermal ice protection systems comprise a number of heater devices (such as heater mats), which can be used as anti-icing zones in which a sufficient temperature is maintained at the surface of the wing in order to prevent the formation of ice on and behind the protected zone. These heater devices can also be used as de-icing zones to shed ice that has been allowed to accrete on the protected region. The de-icing mats are cyclically energised in order to melt the interface between the wing and the accreted ice, causing the ice to be shed.

In such an ice protection system it is important to avoid overheating of the heater devices (heating mats) in order to avoid a failure either of the devices or in the structure to which the devices are attached. Many modern aircraft (and other structures) use composite materials, which can suffer damage (delamination of the material, for example) at a relatively low temperature. Temperature 'overshoot' of the heater devices must therefore be controlled whilst maintaining rapid heating of the protected surface(s).

Aircraft are normally subject to a range of different icing conditions during flight, such as different air temperatures, air velocities, relative humidity, and so on, which can depend for example on the location, altitude, orientation, air speed or pitch of the aircraft, the prevailing meteorological conditions, and so on. Different icing conditions can determine not only the temperatures and velocities (and so on) at which ice will form on different parts of the aircraft structure, but also the heat loss from the aircraft structure.

FIG. 1 is an illustration of a portion of an aircraft, showing the placement of heater mats and heater zones of an ice protection system of an aircraft. The aircraft 100 includes a fuselage portion 102 and a wing portion 104. On the leading edge 106 of the wing 104 are provided a plurality of heating mats 108, 110, 112 and others (not shown).

Each heater mat is divided into a number of heater zones. The number and size of the heater zones are chosen to suit a particular safety model, for example such that up to two heater zones can fail without causing a hazardous or catastrophic failure of the aircraft. In one aircraft design, safety requirements require each heater mat 110 to be divided into six separate heater zones 114, 116, 118, 120, 122, 124.

Figure 2:
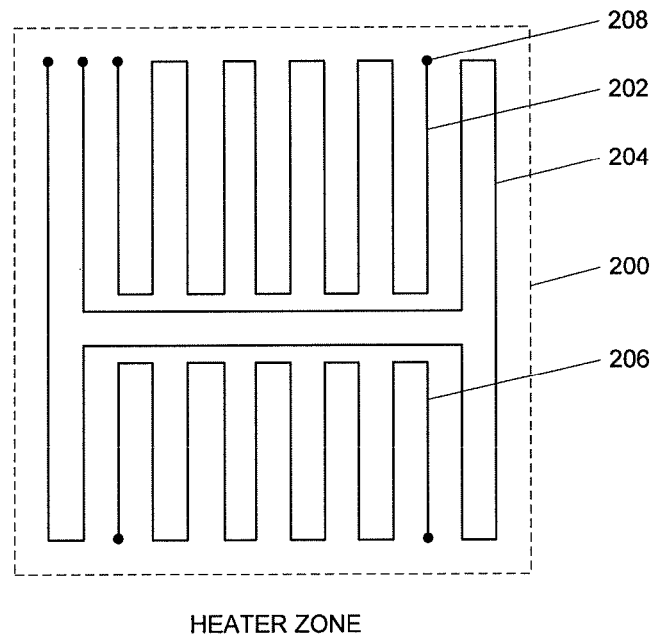
FIG. 2 is a schematic showing the placement of heater elements within a heater zone.

FIG. 2 shows the structure of a heater zone. The heater zone 200 comprises an upper de-icing element 202, a central anti-icing element 204, and a lower de-icing element 206. The elements take the form of resistance heater material arranged in a serpentine configuration and embedded within the heater mat. The elements are provided with contacts 208 to allow power to be applied to the element.

In accordance with known de-icing techniques, the de-icing system, in a de-icing mode, maintains the anti-icing element 204 at a temperature sufficient to prevent ice forming above the element, and intermittently cycles power to the de-icing elements 202, 206 to shed any ice formed above them by run-back water from the anti-icing zone, for example.

Figure 3:
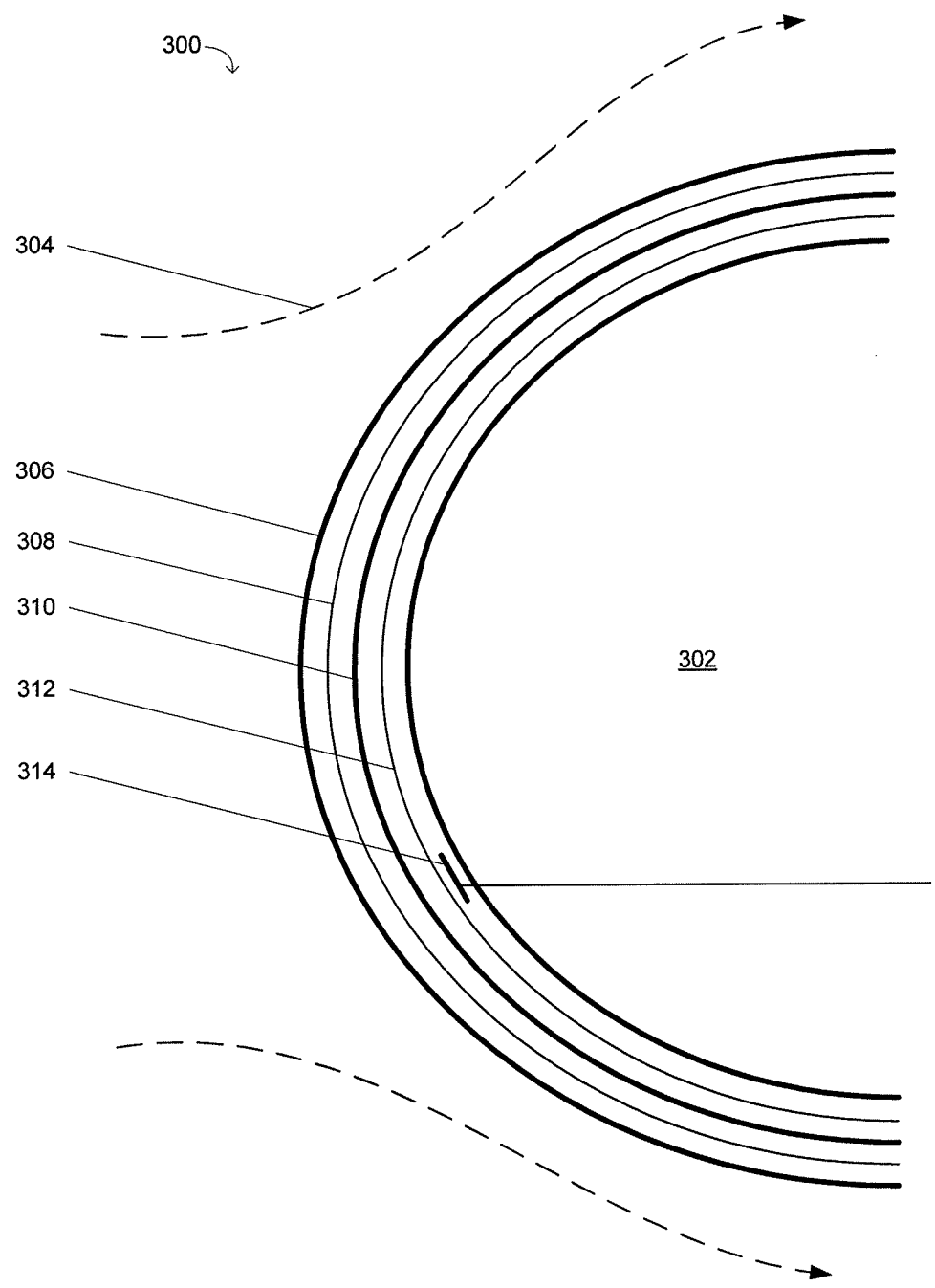
FIG. 3 is a cross-section of the structure of an aircraft wing section.

FIG. 3 is a cross-section 300 of the structure of an aircraft wing section. The figure shows the leading edge 302 of the wing in cross-section and an approximation of the airflow 304 over the wing whilst in flight. The wing includes an erosion shield 306, typically a stiff, erosion-resistant aluminium shield, a dielectric (insulator) 308, a heater mat 310, another dielectric 312, and a temperature probe 314. The layers 306, 308, 310, 312 are much thinner than as shown, forming a thin sandwich at the edge of the wing section.

The main wing section 302 is formed from any appropriate material, such as composite materials that comprise a plurality of layers of stiff material bound together with glue.

Composite materials have a good ratio of strength to weight, but are susceptible to failure by delamination (when the glue melts) at a relatively low temperature. Therefore care needs to be taken to avoid 'overshoot' (overheating) of the heater mat.

It will be appreciated that a similar arrangement may be provided on other exposed parts of the aircraft structure (such as on propeller leading edges or on engine inlets, for example). It will also be appreciated that the temperature sensor 314 may be located between the heater mat 310 and the erosion shield 306.

Detecting Icing Conditions

In a first aspect of the invention, a controller (not shown in any figures) controls the ice protection system in an Icing Conditions Detection (ICD) mode. In this mode, the ice protection system is driven to detect ice in the prevailing environmental conditions in which the structure is placed.

In the ICD mode, first and second heater mats 306 are supplied with respective first and second powers. First and second heater mats are chosen such that they experience substantially the same environmental conditions as each other. For example, each of the first and second heater mats may be on the leading edge of the same wing of an aircraft. Alternatively, the first and second heater mats may be on leading edges of different wings. So long as the heater mats experience the same environmental conditions, any combination of heater mats may be chosen.

The first heater mat is driven to achieve a first surface temperature at a first region of the structure adjacent the first heater mat. Likewise, the second heater mat is driven to achieve a second surface temperature at a second region of the structure adjacent the second heater mat.

The first surface temperature is greater than the second surface temperature. Preferably, the first surface temperature is greater than or equal to 0° C., and the second surface temperature is less than 0° C. In practice, the desired first surface temperature is between 3 to 5° C., and the second desired surface temperature is −3° C. to −5° C.

The controller controls the heater mats to achieve the desired surface temperatures according to the preferred methods discussed in the before-mentioned patents and applications in the name of Ultra Electronics Limited. As well as monitoring the surface temperature, the controller monitors the power delivered to the first and second heater mats.

In the situation where the prevailing environmental conditions are not conducive to ice formation (i.e. temperature is too high, liquid water content is too low etc), the first and second powers will be substantially similar.

However, in the situation where the prevailing environmental conditions are conducive to icing, then there will be a difference in the power levels supplied to the first and second mats. Surprisingly, it has been found that the power required to drive the first heater mat (i.e. to achieve a surface temperature greater than or equal to 0° C.) will be greater than the power supplied to the second heater mat (i.e. to achieve a surface temperature less than 0° C.). In some conditions, the difference was found to be in the order of two or more times greater.

The substantial difference in power requirement is as a result of the first heater mat having to overcome an energy deficit caused by the absorption of heat by water or ice particles in the environment surrounding the structure as they impinge on the surface of the structure.

The controller is adapted to detect this difference in power and alert a user to the fact that the structure is in an environment where ice may form due to the prevailing conditions. The user may then choose to activate the ice protection system manually to ensure that ice does not form on the structure.

Alternatively, the controller may automatically activate the ice protection system in order to prevent ice forming on the surface of the structure in response to the detection of prevailing environmental conditions that are conducive to ice forming on a structure.

Furthermore, it is has been found that the system may determine a measure of the concentration of the water or ice particles in the prevailing environment. If the performance of the structure comprising the heater mats is know for dry or non-ice conditions, then any difference of the power drawn to achieve the desired surface temperatures in a different environment enables the system to determine a concentration of the water or ice particles in the prevailing environment. It has been found that the difference in power required to achieve the desired temperatures in a non-dry condition is proportional to the concentration of water or ice particles in the environment.

The performance of the structure in a dry, or non-ice condition may be know for example by generating a model of the power consumed by the mats in achieving the desired first and/or second temperatures in dry or non-ice conditions.

Detecting Ice Formed on a Structure

In a related aspect, the controller controls the ice protection system in an Ice Detection (ID) mode. In this mode, the ice protection system is driven to detect ice that has already formed on the structure.

In brief, a heater mat is supplied with power, and the surface temperature is monitored over time by the controller, which looks for changes in the rate of change of temperature over time.

Figure 4:
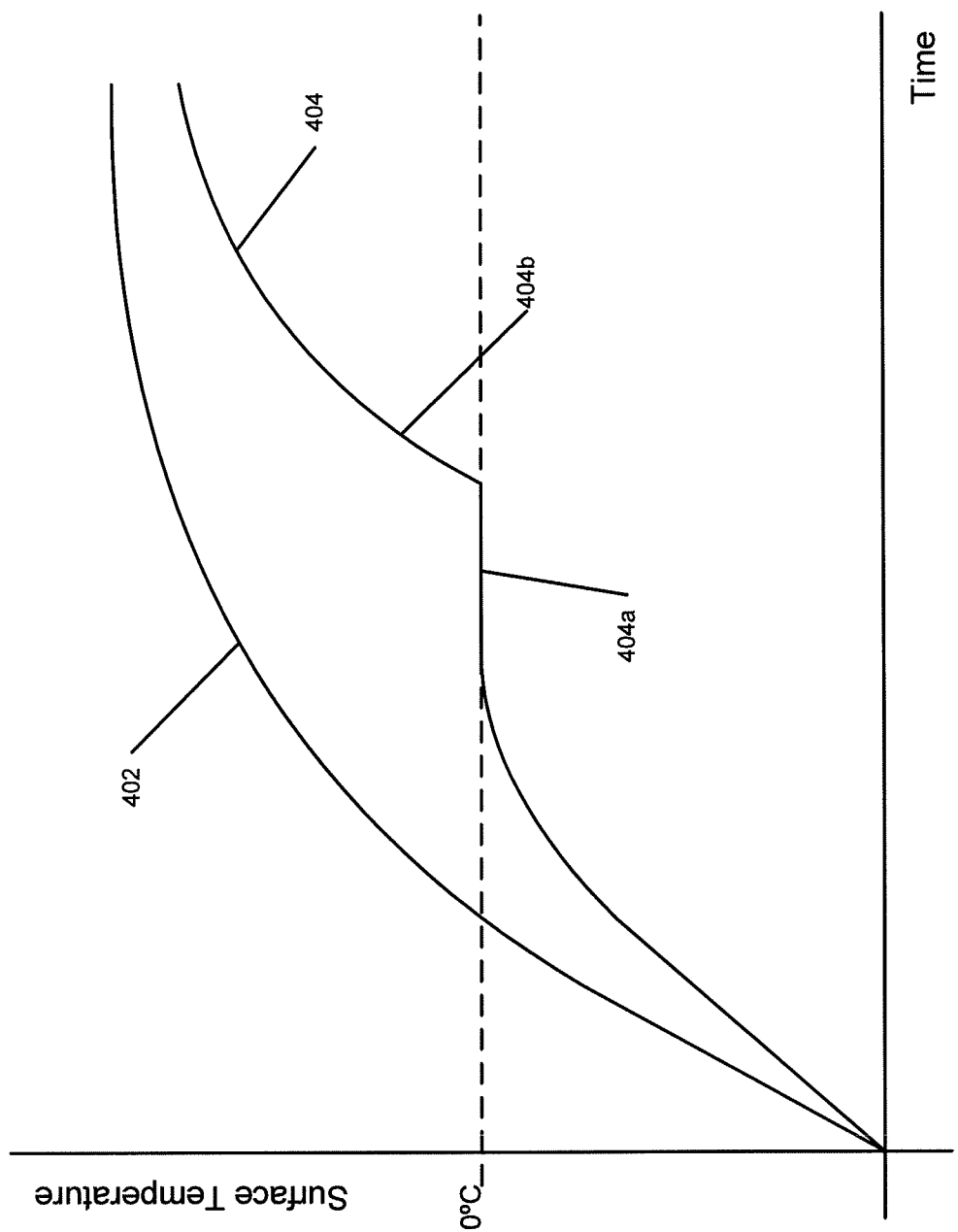
FIG. 4 shows a graph of the rise in temperature over time as a heater mat of a de-icing system is supplied with power.

FIG. 4 shows a graph of the rise in temperature over time as the heater mat is supplied with power.

Line 402 shows the rise in temperature over time as the heater mat is supplied with power when there is no ice present on the structure. Line 404 shows the rise in temperature over time as the heater mat is supplied with power when there is ice present on the structure. As can be seen, line 404 comprises portion 404a where the rate of change of temperature over time decreases (shown here as a flat portion). The rate of change of temperature than begins to rise again (portion 404b) until a desired temperature is reached (or, in a fixed power system, where the temperature for that power is reached).

In practice, the variation in the rate of change of temperature over time occurs around approximately 0° C., as the ice on the structure absorbs heat (and therefore energy), melts and transitions from a solid to a liquid. Once melted, the rate of change of temperature increases as the surface temperature is able to rise.

As such, it is possible to detect the presence of ice on a structure by monitoring the rate of change of temperature over time and detecting any sudden variations in that rate of change and comparing that change in the rate of change to a threshold value. Ice can be detected from either or both the sudden decrease (404a) and the sudden increase (404b). Since one transition (404a) will have a negative change in the rate of change, and the other (404b) a positive change in the rate of change, a magnitude can be determined from the negative and/or positive rates of change, and compared to the threshold value.

This method may be performed by the controller.

Alternatively a pattern matching method may be used, where the temperature rise over time (for a given power) for the structure without ice on the surface is known (for example by storing in a model), and the controller compares the shape of the measured curve to that stored in the model. Any variations from the known model may indicate the presence of ice on the surface of the structure.

As discussed above, a concentration of the ice formed on the structure may be determined by the system. As with the above embodiments, the power used to achieve a desired temperature on the structure is compared to the power used to achieve the same temperature when in a non-ice or dry condition (for example from a model). A difference in the required and known powers enables a concentration of ice formed on the structure to be determined, since the difference is proportional to the concentration of ice.

Once the controller detects the presence of ice on the surface of the structure, it may produce a warning for a user to initiate a de-icing mode of the de-icing system.

Alternatively, the controller may automatically initiate a de-icing mode of the de-icing system.

In the above embodiments, it is desirable for the controller to operate based on temperature signals indicative of the surface temperature of the structure. As would be appreciated by the skilled reader, it is not always possible for the sensor to be placed directly on the surface (whether internal or external) of the structure (for example an aircraft wing). The temperature sensor 314 is often placed away from the surface of the structure (with the heater mat in between the sensor and the external surface of the structure). As such, it can be difficult to determine a measurement of the external surface temperature, from which the controller may control the various modes.

One such solution to this problem is discussed in Ultra Electronics Limited's earlier application.

Figure 5:
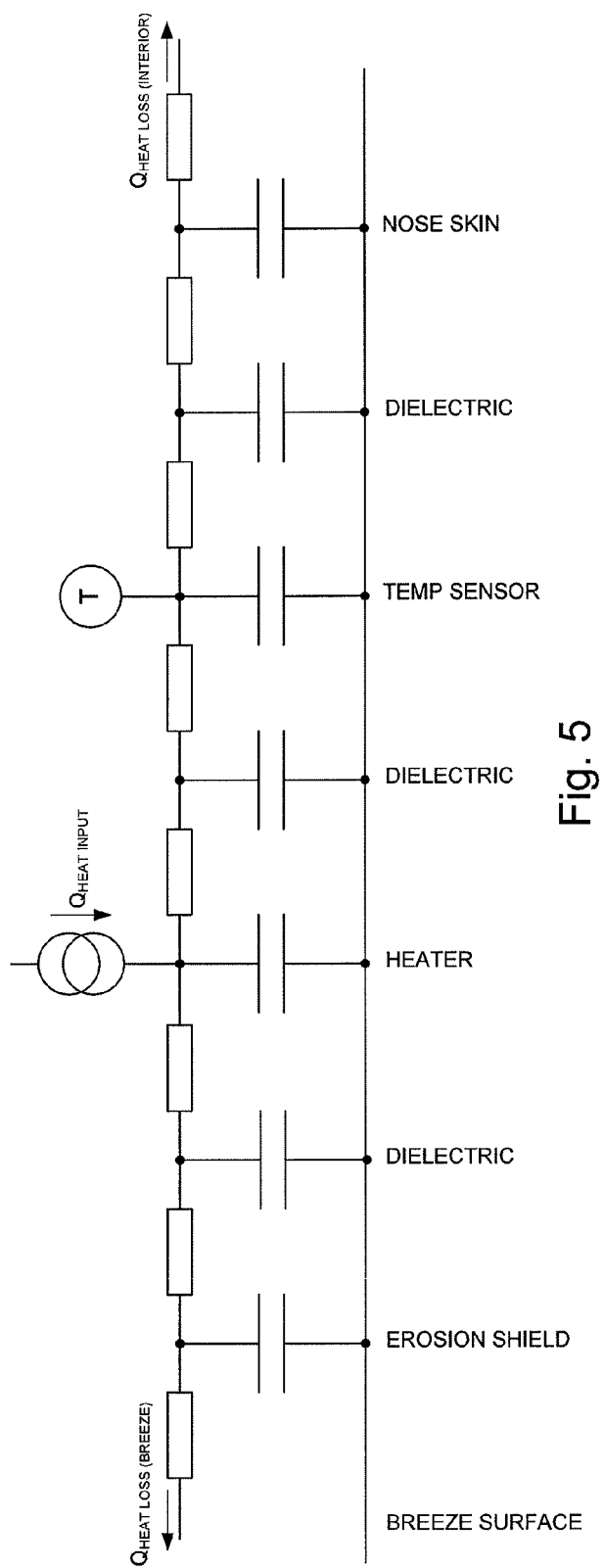
FIG. 5 is an illustration of thermal resistances and thermal capacitances of the wing section of FIG. 3.

FIG. 5 is an illustration of thermal resistances and thermal capacitances of the wing section of FIG. 3.

The thermal resistances (degree of thermal insulation) and thermal capacitances (heat capacity) are illustrated using electrical equivalents, with heat flow corresponding to electrical current and temperatures corresponding to voltages. In this representation, the heat generated by the heater mat is represented by a current source $Q_{HEAT\ INPUT}$ and the temperature sensor 314 of FIG. 3 is represented as a voltage measurement. Each of the layers has an associated thermal capacity (which may be negligible) and the thermal resistance of each layer is also shown. The heat loss at the breeze surface (the interface with the air impinging on the wing), $Q_{HEAT\ LOSS\ (BREEZE)}$, and the heat loss into the interior of the wing, $Q_{HEAT\ LOSS\ (INTERIOR)}$, are also indicated (as currents flowing out of the thermal circuit). The heat loss $Q_{HEAT\ LOSS\ (INTERIOR)}$ into the interior of the structure is considerably less than the heat loss $Q_{HEAT\ LOSS\ (BREEZE)}$ through the erosion shield (by design).

The thermal properties of the wing section during normal ice protection conditions (during flight) will now be described in more detail.

Figure 6:
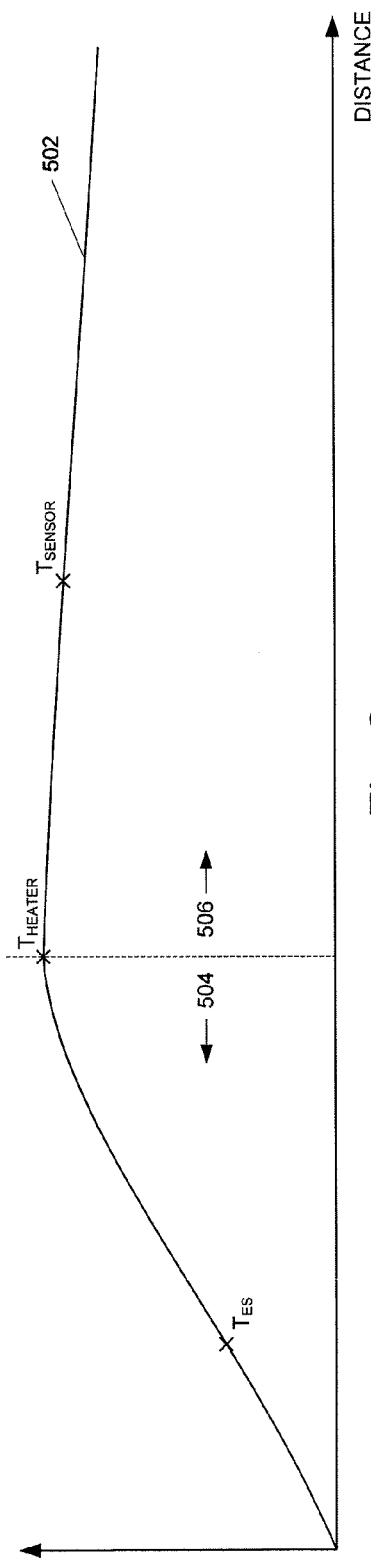
FIG. 6 is a graph illustrating the variation of temperature over distance within the wing section of FIG. 3.

FIG. 6 is a graph illustrating the variation of temperature over distance within the wing section of FIG. 3. The temperature 502 is plotted from the left hand side 504, where large amounts of heat flow through the erosion shield, to the right hand side 506, where heat is slowly lost into the wing structure. The gradient of the curve 502 is equivalent to the thermal gradient (although not drawn to scale).

The heater Temperature $T_{HEATER}$, the temperature sensor temperature $T_{SENSOR}$ and the erosion shield temperature $T_{ES}$ are indicated on the temperature curve 502. The temperature sensor temperature $T_{SENSOR}$ is approximately equal to the heater mat Temperature $T_{HEATER}$ because of the shallow thermal gradient flowing into the structure 506. The erosion shield temperature $T_{ES}$ is quite different, however, because of the steep temperature gradient flowing out of the wing 504. In accordance with the electrical analogy in FIG. 4, the temperature T is substitutable for a voltage, and a corresponding current can be derived from the gradient of the curve 502.

As such, the temperature of the surface can be determined from the known properties of the component parts of the surface, the known amount of power supplied to the heater mat, and from a measurement of the temperature sensor adjacent the heater mat.

Although the present invention has been described hereinabove with reference to specific embodiments, the present invention is not limited to the specific embodiments and modifications will be apparent to a skilled person in the art which lie within the scope of the present invention. Any of the embodiments described hereinabove can be used in any combination.

Although embodiments of the present invention have been described with reference to an aircraft structure, the present invention is applicable to any engineering structure, including static structures such as bridges and oil rigs, or wind turbines. In such static structures a mode of operation comprises a mode of use e.g. loading on a bridge or drilling operations performed on an oil rig. Furthermore, aspects of the embodiments described can be implemented either in software or hardware.

What is claimed is:

1. A method of detecting an icing condition in which ice may form on a structure, the method comprising:
    supplying a first heater with a first power, the first heater being in thermal contact with a first region of a structure, and the first power being sufficient to heat the first region of the structure to a first temperature;
    supplying a second heater with a second power, the second heater being in thermal contact with a second region of the structure, and the second power being sufficient to heat the second region of the structure to a second temperature; and
    comparing the first and second powers to identify a difference between the first and second powers; and
    detecting an icing condition when the difference between the first and second powers is substantial,
    wherein the first and second regions are subjected to substantially the same environmental conditions, and
    wherein the first temperature is higher than the second temperature.

2. A method according to claim 1, wherein the difference between the first and second powers indicative of an icing condition is two or more times greater than the second power.

3. A method according to claim 1, further comprising determining a concentration of water or ice particles in the environmental conditions, the determining comprising:
    comparing the first or second powers with a model defining first and second powers sufficient to drive the respective first or second heater mats such that the first or second regions are heated to the respective first and second temperatures when the first and second regions are in a non-icing condition; and
    determining a concentration of water or ice particles in the environmental conditions based on a difference in the compared first or second powers and the first or second powers defined in the model.

4. A method according to claim 1, wherein the first temperature is greater than or equal to 0° C., and the second temperature is less than 0° C.

5. A method according to claim 4, wherein the first temperature is between 3° C. to 5° C., and the second temperature is between minus 3° C. to minus 5° C.

6. A method according to claim 1, wherein the method is repeated periodically.

7. A method according to claim 6, wherein, when repeated, the first heater is supplied with the second power to heat the first region to the second temperature, and the second heater is supplied with the first power to heat the second region to the first temperature.

8. A method according to claim 6, wherein the repeating interval is substantially 30 seconds.

9. A method of detecting ice formed on a structure, the method comprising:
    supplying power to a heater mat, the heater mat being in thermal contact with a structure on which ice is to be detected, and the power being sufficient to heat a surface of a structure adjacent the heater mat to greater than 0° C.;
    measuring a surface temperature of the structure adjacent the heater mat over a first and second period;
    determining a first and second rate of change of the surface temperature over the respective first and second periods;
    comparing the determined first and second rate of change of the surface temperature to determine a difference between the first and second rate of change of the surface temperature; and
    detecting ice formed on the structure based on a difference between the first and second rate of change of the surface temperature being greater than a threshold value.

10. A method according to claim 9, wherein the threshold value is determined from a model of a rate of change of the surface temperature for the structure having no ice on the surface.

11. A method according to claim 9, wherein measuring the surface temperature of the structure comprises determining the surface temperature from a sensor mounted adjacent to, and in thermal contact with, the heater mat.

12. A method according to claim 9, wherein determining a difference between the first and second rate of change of the surface temperature comprises determining the magnitude of the difference between the first and second rate of change.

13. A method according to claim 9, further comprising determining a concentration of ice formed on the structure, the determining comprising:
   comparing the power supplied to the heater mat with a model defining powers sufficient to drive the heater mat such that the surface of a structure adjacent the heater mat to greater than 0° C. when a structure is in a non-icing condition; and
   determining a concentration of ice formed on the structure based on a difference in the compared power and the power defined in the model.

14. A method of detecting ice formed on a structure, the method comprising:
   supplying power to a heater mat, the heater mat being in thermal contact with a structure on which ice is to be detected, and the power being sufficient to heat a surface of a structure adjacent the heater mat to greater than 0° C.;
   measuring a surface temperature of the structure adjacent the heater mat over a first period;
   comparing the measured surface temperature over the first period with a model defining surface temperature characteristics of the structure and heater mat; and
   detecting ice formed on the structure based on a difference between the measured surface temperature and the model.

15. A method according to claim 14, wherein the model defining surface temperature characteristics of the structure and heater mat comprises data defining a temperature characteristic for a power supplied to the heater mat when the structure has no ice on the surface or when the structure is in a non-icing condition.

16. A method according to claim 14, comprising determining a concentration of ice formed on the structure by:
   comparing the power supplied to the heater mat with a model defining powers sufficient to drive the heater mat such that the surface of the structure adjacent the heater mat to greater than 0° C. when a structure is in a non-icing condition; and
   determining a concentration of ice formed on the structure based on a difference in the compared power and the power defined in the model.

17. An apparatus for detecting ice formed on a structure, the apparatus comprising:
   a heater mat thermally coupleable to a structure for heating a first region of a structure adjacent to the heater mat;
   a temperature sensor for outputting a temperature sensor signal indicative of a temperature of the first region;
   a controller for controllably applying power to the heater mat, the controller being adapted to:
   supply a first power to the heater mat, the first power being sufficient to heat the first region of a structure to greater than 0° C.;
   receive a temperature sensor signal indicative of a temperature of the first region;
   determine a first and second rate of change of the surface temperature over a respective first and second period;
   compare the determined first and second rate of change of the surface temperature to determine a difference between the first and second rate of change of the surface temperature; and
   detect ice formed on the structure based on a difference between the first and second rate of change of the surface temperature being greater than a threshold value.

18. An apparatus according to claim 17, wherein the threshold value is determined from a model of the rate of change of the surface temperature for the structure having no ice on the surface.

19. An apparatus according to claim 17, wherein the temperature sensor is mounted adjacent to, and in thermal contact with, the heater mat.

20. An apparatus according to claim 17, wherein the controller is adapted to determine the magnitude of the difference between the first and second rate of change.

21. An apparatus according to claim 17, wherein the controller is adapted to determine a concentration of ice formed on the structure by:
   comparing the power supplied to the heater mat with a model defining powers sufficient to drive the heater mat such that the surface of the structure adjacent the heater mat to greater than 0° C. when the structure is in a non-icing condition; and
   determining a concentration of ice formed on the structure based on a difference in the compared power and the power defined in the model.

22. An aircraft comprising the apparatus according to claim 17, wherein the heater mats are thermally coupled to the aircraft structure.

23. A controller for detecting ice formed on a structure, the controller for controlling an ice protection system, the controller comprising:
   an output adapted to supply a first power to a heater mat of an ice protection system, the heater mat being thermally coupleable to a structure for heating a first region of a structure adjacent to the heater mat; and
   an input adapted to receive a temperature sensor signal from a temperature sensor, the temperature sensor signal indicating a temperature at a first region of a surface adjacent to a heater mat,
   the controller being adapted to:
   supply a first power to the heater mat, the first power being sufficient to heat the first region of the structure to greater than 0° C.;
   receive a temperature sensor signal indicative of a temperature of the first region;
   determine a first and second rate of change of the surface temperature over a respective first and second period;
   compare the determined first and second rate of change of the surface temperature to determine a difference between the first and second rate of change of the surface temperature; and
   detect ice formed on the structure based on a difference between the first and second rate of change of the surface temperature being greater than a threshold value.

24. A controller according to claim 23, wherein the threshold value is determined from a model of the rate of change of the surface temperature for the structure having no ice on the surface.

25. A controller according to claim 23, wherein the controller is adapted to determine the magnitude of the difference between the first and second rate of change.

26. A controller according to claim 23, wherein the controller is adapted to determine a concentration of ice formed on the structure by:
comparing the power supplied to the heater mat with a model defining powers sufficient to drive the heater mat such that the surface of the structure adjacent the heater mat to greater than 0° C. when the structure is in a non-icing condition; and
determining a concentration of ice formed on the structure based on a difference in the compared power and the power defined in the model.

27. An aircraft comprising:
a de-icing system comprising one or more heater mats thermally coupled to a structure of the aircraft; and
a controller according to claim 23.

28. An apparatus for detecting ice formed on a structure, the apparatus comprising:
a heater mat thermally coupleable to a structure for heating a first region of a structure adjacent to the heater mat;
a temperature sensor for outputting a temperature sensor signal indicative of a temperature of the first region;
a controller for controllably applying power to heater mat, the controller being adapted to:
supply power to the heater mat, the power being sufficient to heat a surface of the structure adjacent the heater mat to greater than 0° C.;
measure a surface temperature of the structure adjacent the heater mat over a first period;
compare the measured surface temperature over the first period with a model defining surface temperature characteristics of the structure and heater mat; and
detect ice formed on the structure based on a difference between the measured surface temperature and the model.

29. An apparatus according to claim 28, wherein the model defining surface temperature characteristics of the structure and heater mat comprises data defining a temperature characteristic for a power supplied to the heater mat when the structure has no ice on the surface or when the structure is in a non-icing condition.

30. An apparatus according to claim 28, wherein the controller is adapted to determine a concentration of ice formed on the structure by:
comparing the power supplied to the heater mat with a model defining powers sufficient to drive the heater mat such that the surface of the structure adjacent the heater mat to greater than 0° C. when the structure is in a non-icing condition; and
determining a concentration of ice formed on the structure based on a difference in the compared power and the power defined in the model.

31. An aircraft comprising the apparatus according to claim 28, wherein the heater mats are thermally coupled to the aircraft structure.

32. A controller for detecting ice formed on a structure, the controller for controlling an ice protection system, the controller comprising:
an output adapted to supply a first power to a heater mat of an ice protection system, the heater mat being thermally coupleable to a structure for heating a first region of a structure adjacent to the heater mat; and
an input adapted to receive a temperature sensor signal from a temperature sensor, the temperature sensor signal indicating a temperature at a first region of a surface adjacent to a heater mat,
the controller being adapted to:
supply power to the heater mat, the power being sufficient to heat the surface of the structure adjacent the heater mat to greater than 0° C.;
measure a surface temperature of the structure adjacent the heater mat over a first period;
compare the measured surface temperature over the first period with a model defining surface temperature characteristics of the structure and heater mat; and
detect ice formed on the structure based on a difference between the measured surface temperature and the model.

33. A controller according to claim 32, wherein the model defining surface temperature characteristics of the structure and heater mat comprises data defining a temperature characteristic for a power supplied to the heater mat when the structure has no ice on the surface or when the structure is in a non-icing condition.

34. A controller according to claim 32, wherein the controller is adapted to determine a concentration of ice formed on the structure by:
comparing the power supplied to the heater mat with a model defining powers sufficient to drive the heater mat such that the surface of the structure adjacent the heater mat to greater than 0° C. when a structure is in a non-icing condition; and
determining a concentration of ice formed on the structure based on a difference in the compared power and the power defined in the model.

35. An aircraft comprising:
a de-icing system comprising one or more heater mats thermally coupled to a structure of the aircraft; and
a controller according to claim 32.

* * * * *